June 7, 1932.  A. G. BUCHAN  1,861,787
CUTTER FOR WOODWORKING MACHINES
Filed Oct. 9, 1930
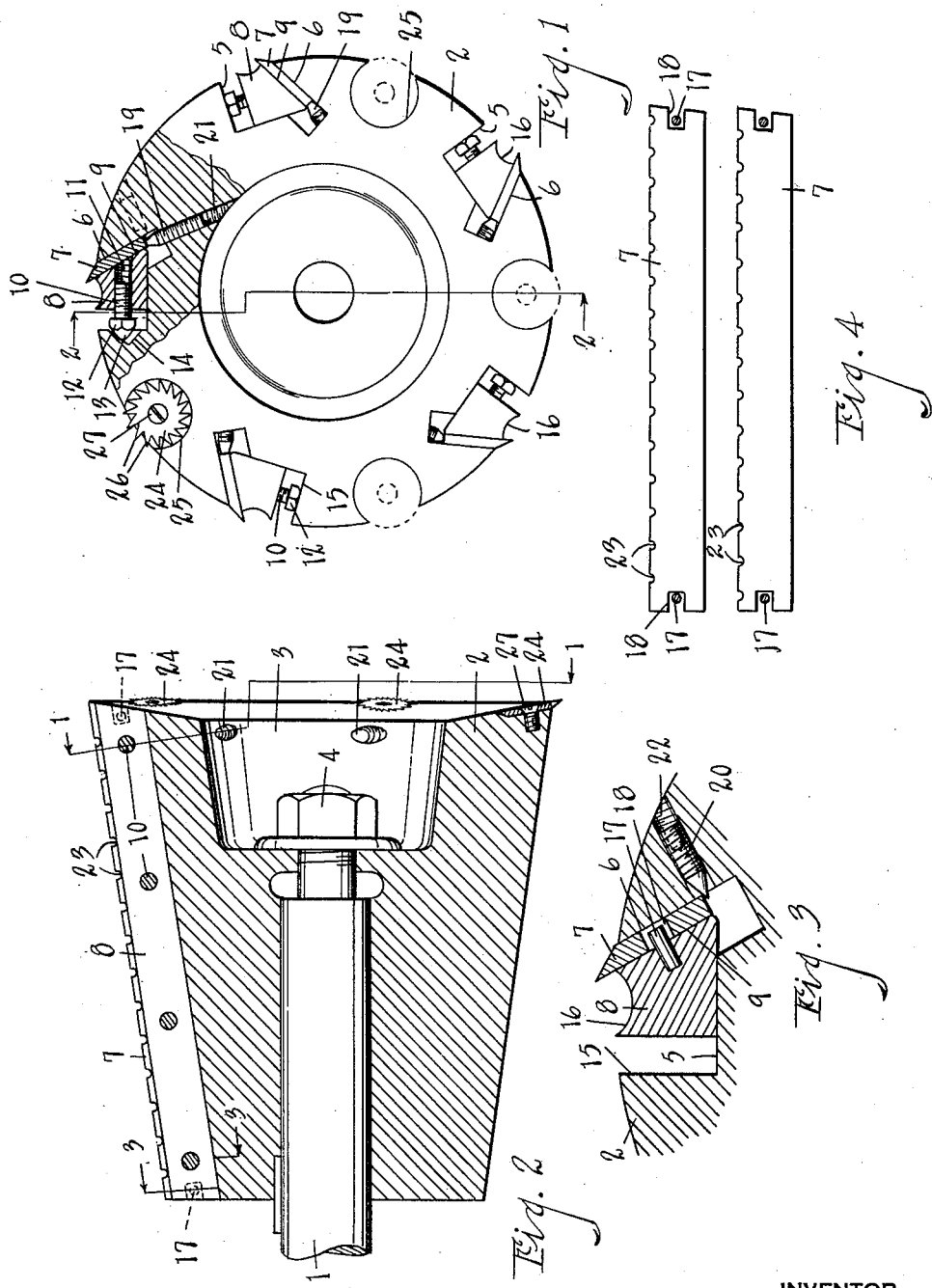
INVENTOR
Andrew G. Buchan
BY
Chappell & Earl
ATTORNEYS Patented June 7, 1932

1,861,787

UNITED STATES PATENT OFFICE

ANDREW G. BUCHAN, OF GRAND RAPIDS, MICHIGAN, ASSIGNOR TO LEITELT IRON WORKS, OF GRAND RAPIDS, MICHIGAN

CUTTER FOR WOODWORKING MACHINES

Application filed October 9, 1930. Serial No. 487,552.

The main objects of this invention are:

First, to provide a cutter head for woodworking machines having kerf teeth that may be adjusted by an unskilled workman to present new or selected teeth and to replace worn teeth.

Second, to provide in a rotary cutter improved means for adjustably supporting the blades.

Objects pertaining to details and economies of my invention will definitely appear from the description to follow. The invention is defined in the claims.

A structure embodying the features of my invention is clearly illustrated in the accompanying drawing, in which:

Fig. 1 is an end elevation of my improved cutterhead partially broken away and partially in section on line 1—1 of Fig. 2 to show structural details.

Fig. 2 is a longitudinal section on line 2—2 of Fig. 1, a shaft or arbor being shown in full lines.

Fig. 3 is an enlarged detail section on line 3—3 of Fig. 2.

Fig. 4 is a side elevation of a pair of the blades showing their relation in the head, particularly as regards their notched edges.

Referring to the drawing, 1 represents the shaft or arbor of the cutter. The head 2 in the embodiment illustrated is tapered inwardly and is provided with a recess 3 in its larger end adapted to receive the clamping nut 4 for retaining the head upon the shaft. The head is provided with a plurality of longitudinal grooves 5, the rear walls 6 of these grooves being inwardly inclined to provide inclined seats for the blades 7.

The grooves are of suitable width to receive the blade holder bars 8 which have inclined faces 9 parallel to the blade seats and clamping the blades against the seats. Each bar is provided with a plurality of screws 10 arranged in threaded bores 11 therein and having heads 12 with conical tips 3 engaging the conical recesses 14 in the wall 15 of the groove so that by turning these screws in the proper direction the bar is forced into clamping engagement with the blade and, also, the bar is securely retained within the groove. The outer faces 16 of the clamping bars are longitudinally grooved to provide clearance for the blades.

The blades are further retained for purposes of assembly and adjustment by means of the pins 17 on the bars engaging slots 18 in the ends of the blades. To accurately adjust the blades to cutting position I provide adjusting screws 19 and 20. The adjusting screws 19 are arranged in threaded bores 21 extending from the recess 3 to the groove while the screw 20 is arranged in a threaded bore 22 extending from the periphery of the head to the groove, see Figs. 1 and 3. Both screws engage the inner edge of the blade.

The edges of the blades are preferably provided with notches 23 and the notches of adjacent blades are arranged in staggered relation, the purpose of which is to facilitate the cutting action of the blade and lessening the tearing action on the grain of the wood.

I also provide the cutter with dado or kerf-cutting teeth in the form of disks 24 which are arranged in circular recesses 25 which cut or open into the periphery of the head. These cutters 24 have a series of peripheral teeth 26 and are secured in the recesses for rotative adjustment by means of the screws 27 so that selected teeth may be brought into operative position by such rotative adjustment. The teeth are always properly positioned, that is, no skill is required on the part of the operator to position the teeth.

A further advantage of this is that while there is one tooth which will project beyond the others, two or more other teeth are always in operative relation to assist in the cutting or clearing action.

My improved cutter is especially designed for the forming of tenons and mortises in large timbers, the head illustrated being especially designed for a tenoning machine and consequently tapered. The cutters may be fed very rapidly through the work without clogging and with no tendency to "hog" into the work, that is, they are of large capacity.

I have illustrated my invention as I have embodied the same in practice. I have not attempted to illustrate or describe other embodiments as I believe the disclosure made will enable those skilled in the art to embody or adapt the same as may be desired.

Having thus described my invention what I claim as new and desire to secure by Letters Patent is:

1. In a cutter, the combination of a rotary head provided with a plurality of blades and having a plurality of circular recesses in one end thereof opening to the periphery of the head, and disk-like circular cutters having a peripheral series of teeth adjustably mounted in said recesses so that a plurality of the teeth project beyond the periphery of the cutter head and said end cutters may be rotatively adjusted to present selected teeth.

2. In a cutter, the combination of a rotary head provided with a plurality of blades and having a plurality of recesses in one end thereof opening to the periphery of the head, and disk-like circular cutters having a peripheral series of teeth adjustably mounted in said recesses so that they may be rotatively adjusted to present selected teeth.

3. In a cutter, the combination of a rotary head provided with a longitudinal groove, the rear wall of which is inwardly inclined providing an inclined cutter seat, said head having a central recess at its inner end and a threaded bore from said recess to said groove, and a threaded peripheral bore at its opposite end opening to said groove, a cutter blade having slots at the ends thereof arranged on said seat, a blade holder bar arranged in said groove and having an inclined blade clamping face parallel to said seat, said bar being provided with pins projecting into said slots in said blade, clamping screws for said bar provided with tapered heads engaging recesses in the wall of the groove opposite the blade seat, and blade adjusting screws arranged in said threaded bores to coact with the inner edges of the blade.

4. In a cutter, the combination of a rotary head provided with a longitudinal groove, the rear wall of which is inwardly inclined providing an inclined cutter seat, said head having a central recess at its inner end and a threaded bore from said recess to said groove, and a threaded peripheral bore at its opposite end opening to said groove, a cutter blade arranged on said seat, a blade holder bar arranged in said groove and having an inclined blade clamping face parallel to said seat, clamping screws for said bar engaging recesses in the wall of the groove opposite the blade seat, and blade adjusting screws arranged in said threaded bores to coact with the inner edges of the blade.

5. In a cutter, the combination of a rotary head provided with a longitudinal groove, the rear wall of which is inwardly inclined providing an inclined cutter seat, a cutter blade having slots at the ends thereof arranged on said seat, a blade holder bar arranged in said groove and having an inclined blade clamping face parallel to said seat, said bar being provided with pins projecting into said slots in said blade, and clamping screws for said bar provided with tapered head engaging recesses in the wall of the groove opposite the blade seat.

6. In a cutter, the combination of a rotary head provided with a longitudinal groove, one side wall of which constitutes a cutter seat, said head having a central recess at its inner end and a threaded bore from said recess to said groove, and a threaded peripheral bore at its opposite end opening to said groove, a slotted cutter blade on said seat, a blade holder bar arranged in said groove to clamp said blade upon said seat, said bar being provided with pins projecting into said slots in said blade, clamping screws for said bar provided with tapered heads engaging recesses in the wall of the groove opposite the blade seat, and blade adjusting screws arranged in said threaded bores to coact with the inner edges of the blade.

7. In a cutter, the combination of a rotary head provided with a longitudinal groove, one side wall of which constitutes a cutter seat, said head having a central recess at its inner end and a threaded bore from said recess to said groove, and a threaded peripheral bore at its opposite end opening to said groove, a cutter blade arranged on said seat, a blade holder bar arranged in said groove to clamp said blade upon said seat, clamping screws for said bar engaging recesses in the wall of the groove opposite the blade seat, and blade adjusting screws arranged in said threaded bores to coact with the inner edges of the blade.

8. In a cutter, the combination of a rotary head provided with a longitudinal groove, one side wall of which constitutes a cutter seat, a slotted cutter blade arranged on said seat, a blade holder bar arranged in said groove to clamp said blade upon said seat, said bar being provided with pins projecting into said slots in said blade, and clamping screws for said bar provided with tapered heads engaging recesses in the wall of the groove opposite the blade seat.

In witness whereof I have hereunto set my hand.

ANDREW G. BUCHAN.